US007667789B2

(12) United States Patent
Choi et al.

(10) Patent No.: US 7,667,789 B2
(45) Date of Patent: Feb. 23, 2010

(54) BACKLIGHT UNIT AND LIQUID CRYSTAL DISPLAY DEVICE HAVING THE SAME

(75) Inventors: Jae-Chang Choi, Yongin-si (KR); Dong-Gyun Ra, Asan-si (KR)

(73) Assignee: Samsung Electronics Co., Ltd. (KR)

(*) Notice: Subject to any disclaimer, the term of this patent is extended or adjusted under 35 U.S.C. 154(b) by 228 days.

(21) Appl. No.: 11/957,997

(22) Filed: Dec. 17, 2007

(65) Prior Publication Data

US 2008/0198297 A1     Aug. 21, 2008

(30) Foreign Application Priority Data

Dec. 15, 2006    (KR) .................. 10-2006-0128858

(51) Int. Cl.
  *G02F 1/13357* (2006.01)
  *F21V 8/00* (2006.01)
(52) U.S. Cl. ............................. 349/65; 349/58; 349/68; 349/116; 362/276; 362/613; 362/632
(58) Field of Classification Search .................. 349/58, 349/65, 68, 116; 362/97.2, 97.3, 231, 276, 362/612, 613, 631, 632, 633, 634; 250/205, 250/227.31; 345/102
See application file for complete search history.

(56) References Cited

U.S. PATENT DOCUMENTS

| | | | |
|---|---|---|---|
| 6,964,500 B2 * | 11/2005 | Sakai | 362/276 |
| 7,488,104 B2 * | 2/2009 | Hamada et al. | 362/616 |
| 2008/0084520 A1 * | 4/2008 | Nam et al. | 349/65 |
| 2008/0088769 A1 * | 4/2008 | Kim et al. | 349/61 |

FOREIGN PATENT DOCUMENTS

KR         2005035015      *   4/2005

* cited by examiner

*Primary Examiner*—Dung Nguyen
*Assistant Examiner*—Tai Duong
(74) *Attorney, Agent, or Firm*—Cantor Colburn LLP (57) ABSTRACT

A backlight unit which includes a structure in which the sensitivity of a light sensor for detecting color reproducibility of white light is increased, and a liquid crystal display ("LCD") device having the same. The backlight unit includes a light source which generates light, a light guide plate which guides the light incident from the light source, a light sensor which detects the light emitted from the light guide plate and a mold frame which receives the light source, the light guide plate, and the light sensor. The mold frame includes a receiving recess which receives the light sensor, and a light sensing structure formed on a sidewall thereof being in contact with a side of the light guide plate which reflects the light emitted from the light guide plate and provides the light emitted from the light guide plate to the light sensor.

20 Claims, 7 Drawing Sheets

BACKLIGHT UNIT AND LIQUID CRYSTAL DISPLAY DEVICE HAVING THE SAME

This application claims priority to Korean Patent Application No. 10-2006-0128858, filed on Dec. 15, 2006, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") device and, more particularly, to a backlight unit including a structure in which the sensitivity of a light sensor for detecting color reproducibility of white light is increased, and an LCD device including the same.

2. Description of the Related Art

In general, a display device displays an image by converting data in an electrical format processed by an information processor of an electronic product into a visual image. These are various types of display devices such as a cathode ray tube ("CRT"), a plasma display panel ("PDP)", a liquid crystal display ("LCD"), an electroluminescence ("EL"), and the like. The LCD device is a flat panel display device which displays an image using electrical and optical characteristics of a liquid crystal injected therein. Due to various advantages of the LCD device such as being thin in thickness, light in weight and low in power consumption as compared with other display devices, it is widely used in various industrial applications.

The LCD device is not a self-luminous display device. Therefore, it requires a backlight unit which emits light, as a separate light source. In general, the backlight unit uses a light source for generating white light, such as a cold cathode fluorescent lamp ("CCFL"), a flat fluorescent lamp ("FFL"), and the like. Recently, a light emitting diode ("LED") is used to reduce power consumption and improve color reproducibility.

There are two types of LEDs such as a white light LED and a red, green, blue ("RGB") LED. The RGB LED mixes light generated from red, green, and blue chips to generate white light. Since the life span of the red, green and blue chips of the RGB LED is different from one another and the RGB LED includes a brightness variation, the RGB LED detects the brightness of the white light using a light sensor to maintain the color reproducibility of the white light.

The light sensor detects the light of the RGB LED incident to a first surface of a light guide plate and emitted to a second surface of the light guide plate. When the light sensor is positioned on a sidewall of the second surface of the light guide plate, the thickness of the backlight unit is increased due to the thickness of the light sensor. Accordingly, the light sensor is arranged in a lower part of the second surface of the light guide plate.

The light sensor detects light emitted from the second surface of the light guide plate and reflected by a sidewall of a mold frame receiving the light guide plate. When the light guide plate is received in the mold frame, the distance between the light guide plate and the sidewall of the mold frame may vary according to manufacturing conditions. Moreover, when the light guide plate is in contact with the sidewall, the intensity of light reflected by the sidewall and emitted towards the light sensor may be reduced and thereby it is difficult for the light sensor to detect the brightness of light.

BRIEF SUMMARY OF THE INVENTION

The present invention has been made in an effort to solve the above stated problems and aspects of the present invention provide a backlight unit including a mold frame and a light sensing structurelight sensing structure which efficiently reflects light of a light guide plate to increase the sensitivity of a light sensor which detects color reproducibility of white light, and an LCD device including the same.

In an exemplary embodiment, the present invention provides a backlight unit including a light source which generates light, a light guide plate which guides the light incident from the light source and emits the light, a light sensor which detects the light emitted from the light guide plate, and a mold frame which receives the light source, the light guide plate and the light sensor, the mold frame including a receiving recess which receives the light sensor and a light sensing structurelight sensing structure formed on a sidewall thereof being in contact with a side of the light guide plate, which reflects the light emitted from the light guide plate and provides the light emitted from the light guide plate to the light sensor.

In an exemplary embodiment, the light sensing structurelight sensing structure may be formed in a recess shape inside the sidewall.

In another exemplary embodiment, the light sensing structure may include a first surface formed inside the sidewall parallel to a bottom surface of the mold frame, and a second surface formed parallel to an outer surface of the sidewall.

In an exemplary embodiment, the first and second surfaces may be vertically connected to each other.

In another exemplary embodiment, the first and second surfaces may be connected to each other with a curved surface concave toward the light sensor.

In another exemplary embodiment, the light sensing structure may further include a reflecting member which reflects light, to thereby improve light reflectance.

In another exemplary embodiment, the reflecting member may include a sheet which reflects light.

In another exemplary embodiment, the sheet may be attached to the light sensing structure using an adhesive member.

In another exemplary embodiment, the reflecting member may include an adhesion tape formed of a material which reflects light on a side thereof.

In another exemplary embodiment, the reflecting member may include a reflection layer coated with a reflective material on the light sensing structure.

In another exemplary embodiment, the receiving recess may include a hole through which the light passes.

In another exemplary embodiment, the light source may include a light emitting diode ("LED").

In another exemplary embodiment, the light source may include an LED which generates red, green and blue light.

In another exemplary embodiment, the backlight unit may further include a light source substrate which supplies a driving signal and power to the LED.

In another exemplary embodiment, the light guide plate may include a first surface receiving the light supplied from the light source, and a second surface opposite to the first surface. The thickness of the light guide plate is becoming smaller from the first surface toward the second surface.

In another exemplary embodiment, the light sensor may include a circuit board on which the light sensor is mounted and a flexible printed circuit board ("FPCB") which transmits a signal of the light sensor.

In another exemplary embodiment, the present invention provides a liquid crystal display ("LCD") device including an LCD panel which displays an image, and a backlight unit which supplies light to the LCD panel, the backlight unit including a light source which supplies light to the LCD panel, a light guide plate which guides the light incident from the light source and emits the light toward the LCD panel, a light sensor provided in a lower part of the light guide plate which detects the light emitted from the light guide plate, and a mold frame which receives the light source, the light guide plate, and the light sensor, the mold frame including a receiving recess, formed in a rear of the mold frame which receives the light sensor, and a light sensing structure formed on a sidewall thereof being in contact with a side of the light guide plate, which supplies the light emitted from the light guide plate to the light sensor.

In an exemplary embodiment, the light sensing structure may include a first surface formed inside the sidewall parallel to a bottom surface of the mold frame and a second surface formed parallel to an outer surface of the sidewall.

In another exemplary embodiment, the light sensing structure may further include a reflecting member which reflects light, to thereby improve light reflectance.

In another exemplary embodiment, the reflecting member may include at least one of a sheet which reflects light, an adhesion tape of which a side is formed of a reflective material and a reflection film coated with a reflective material on the light sensing structure.

In another exemplary embodiment, the light sensor may further include a circuit board on which the light sensor is mounted, and a flexible printed circuit board ("FPCB") which transmits a signal of the light sensor.

BRIEF DESCRIPTION OF THE DRAWINGS

The above and/or other aspects, features, and advantages of the present invention will now become more apparent from the following detailed description when taken in conjunction with the accompanying drawings, in which.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and wilt fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with references to the accompanying drawings.

Figure 1:
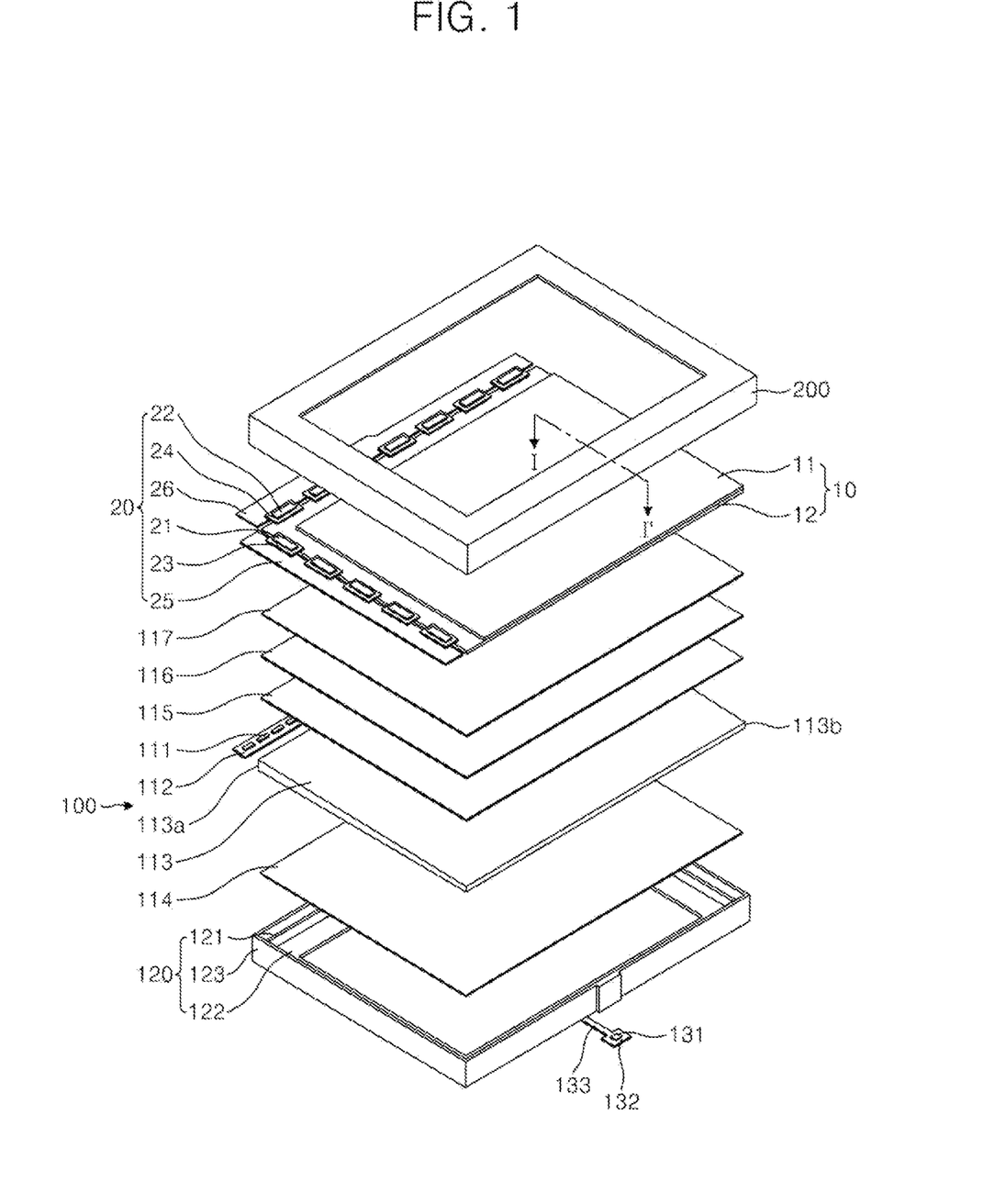
FIG. 1 is an exploded perspective view showing an exemplary embodiment of a liquid crystal display device according to the present invention.
Figure 2:
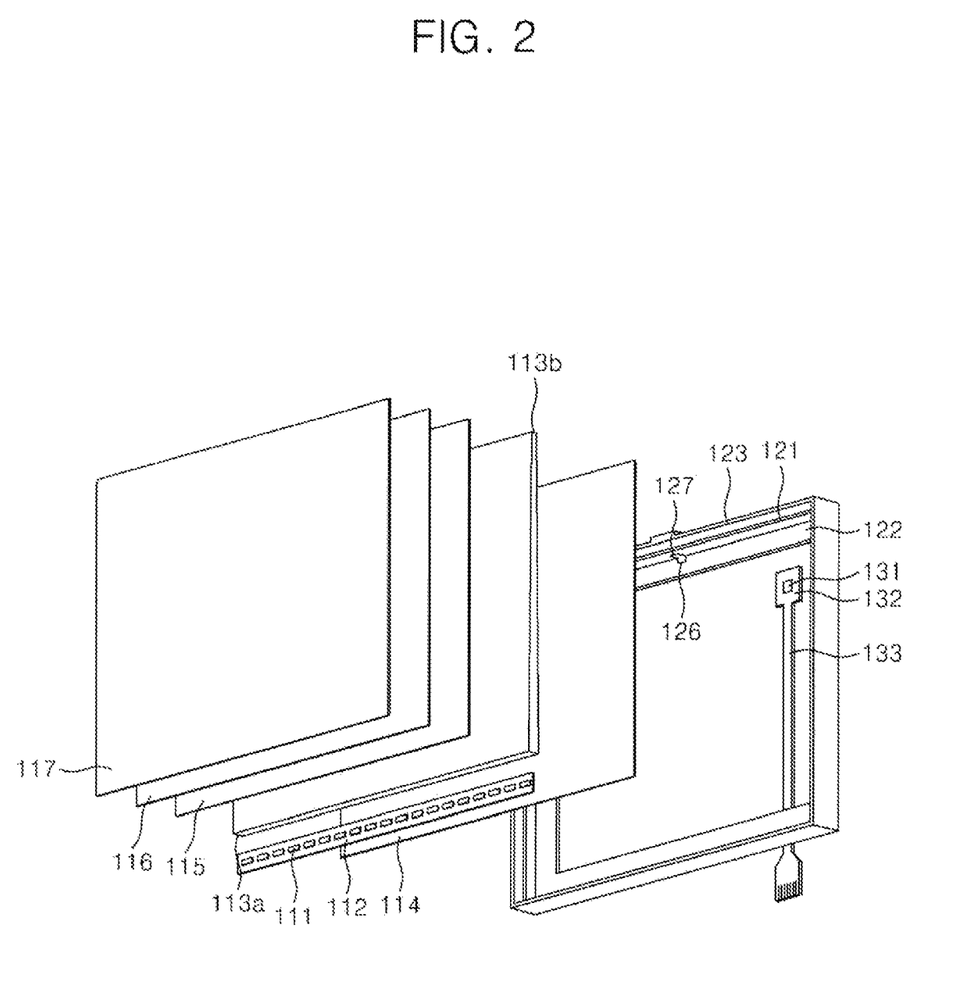
FIG. 2 is an exploded perspective view showing an exemplary embodiment of a backlight unit according to the present invention.
Figure 3:
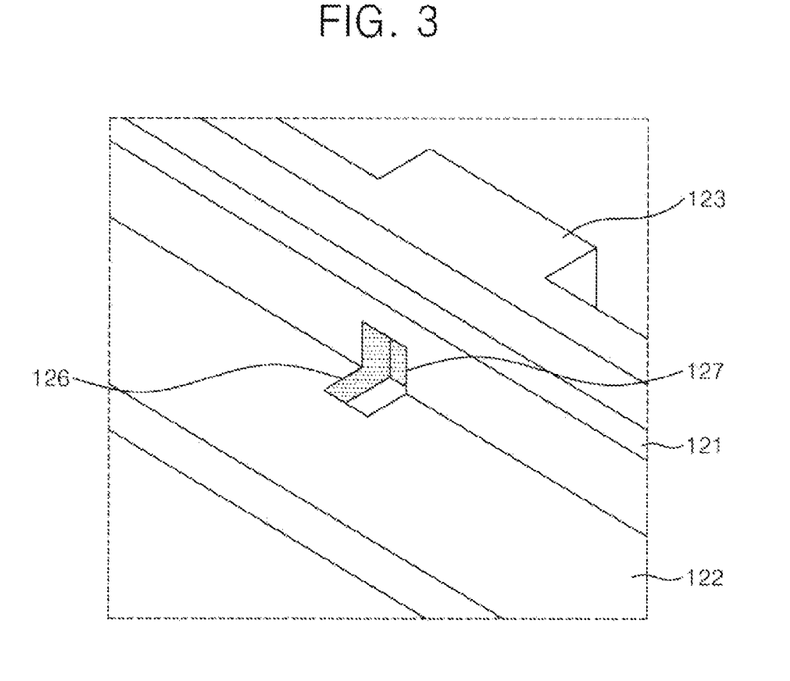
FIG. 3 is a partial perspective view showing an exemplary embodiment of a structure of a mold frame according to the present invention.

FIG. 1 is an exploded perspective view showing an exemplary embodiment of a liquid crystal display ("LCD") device according to the present invention, FIG. 2 is an exploded perspective view showing an exemplary embodiment of a backlight unit according to the present invention. FIG. 3 is a partially perspective view showing an exemplary embodiment of a structure of a mold frame according to the present invention, and FIG. 4 is a partially perspective view showing an exemplary embodiment of a rear structure of a mold frame according to the present invention.

Figure 4:
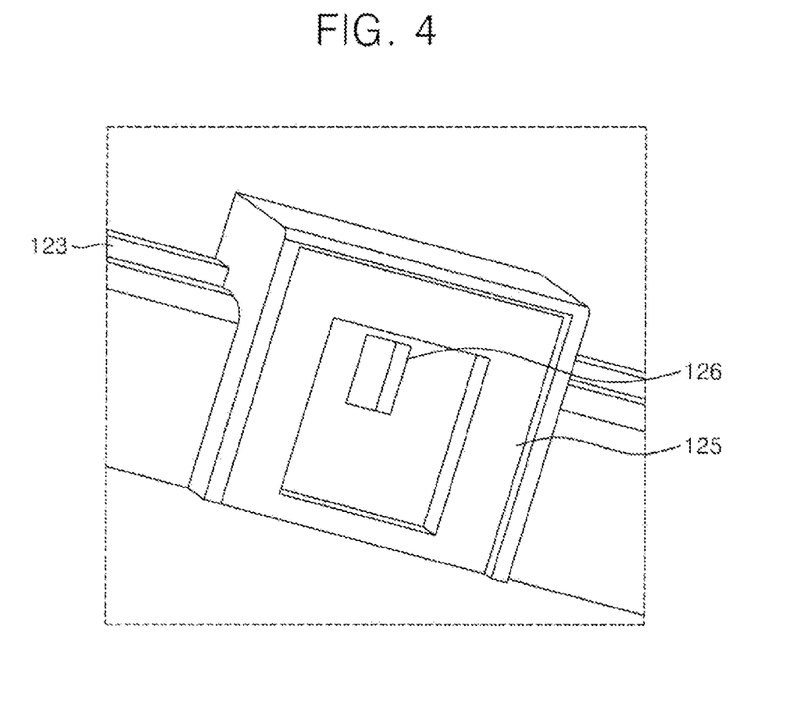
FIG. 4 is a partial perspective view showing an exemplary embodiment of a rear structure of a mold frame according to the present invention.

Referring to FIGS. 1 through 4, a liquid crystal display (LCD) device in accordance with an exemplary embodiment of the present invention, includes an LCD panel 10 which displays an image, a driving circuit 20 which drives the LCD panel 10, a backlight unit 100 which supplies light to the LCD panel 10, and a top chassis 200 which fixes the LCD panel 10. According to an exemplary embodiment, the backlight unit 100 includes a light source 111 which supplies light to the LCD panel 10, a light guide plate 113 which guides light incident from the light source 111 and emits the light toward the LCD panel 10, a light sensor 131 provided in a lower part of the light guide plate 113 which detects the light emitted from the light guide plate 113, a mold frame 120 which receives the light source 111, the light guide plate 113, and the light sensor 131. According to an exemplary embodiment, the mold frame 120 includes a receiving recess 125 (as shown in FIG. 4, for example), formed in a rear of the mold frame 120 which receives the light sensor 131, and a light sensing structure 127 (as shown in FIG. 2, for example) formed on a sidewall 123 being in contact with a side of the light guide plate 113, which supplies the light emitted from the light guide plate 113 to the light sensor 131.

The LCD panel 10 includes a color filter substrate 11 and a thin film transistor ("TFT") substrate 12 attached to the color filter substrate 11. In addition, the LCD panel 10 includes a liquid crystal (not shown) driven by an electric field formed between the color filter substrate 11 and the TFT substrate 12, which controls light transmittance by the electric field.

The liquid crystal is aligned by a difference between a common voltage from a common electrode and a pixel voltage from a pixel electrode of the TFT substrate 12 and controls the light transmittance. To this end the liquid crystal is made of a material including dielectric anisotropy and refractive anisotropy.

The color filter substrate 11 includes a black matrix formed on a transparent insulation substrate such as glass in the form of a matrix, red, green and blue color filters formed in areas defined by the black matrix, and the common electrode applying the common voltage to the liquid crystal.

The black matrix is made of a metal or an organic material including a black color which shields external light and prevents a light leakage current of the TFT substrate 12.

The color filters include the red, green and blue color filters which provide colors. The red, green and blue color filters absorb or transmit light of a specific wavelength through red, green and blue pigments included therein which provide red, green and blue colors. The red, green and blue color filters display various colors by additive mixture of primary colors of the red, green and blue light passed through the red, green and blue color filters.

The common electrode applies the common voltage to the liquid crystal. The common electrode comprises a transparent conductive material such as indium tin oxide ("ITO"), indium zinc oxide ("IZO"), indium tin zinc oxide ("ITZO"), zinc oxide ("ZO"), and the like.

The TFT substrate 12 includes a gate line and a data line formed to cross each other on a transparent insulating substrate such as glass and defining a pixel area, a TFT formed at an intersection between the gate line and the data line, and the pixel electrode connected to the TFT.

The TFT transmits an image signal which is provided from the data line to the pixel electrode in response to a scan signal which is provided from the gate line.

The pixel electrode supplies a pixel voltage to the liquid crystal using to the image signal charged to itself. The pixel electrode includes a transparent conductive material such as indium tin oxide ("ITO"), indium zinc oxide ("IZO"), indium tin zinc oxide ("ITZO"), zinc oxide ("ZO"), and the like.

The driving circuit 20 includes driving integrated circuits ("ICs") 21 and 22, connection films 23 and 24 and circuit boards 25 and 26.

The driving ICs include a gate driving IC 21 which drives the gate line formed on the TFT substrate 12 and a data driving IC 22 which drives the data line. According to an exemplary embodiment of the present invention, the gate driving IC 21 may be formed on the TFT substrate 12 using a chip-on-glass ("COG") method or integrated on the TFT substrate 12 in the form of an amorphous silicon gate ("ASG").

According to an exemplary embodiment the connection films 23 and 24 include a plurality of wirings formed on a film type substrate. In addition the connection films 23 and 24 include the driving ICs 21 and 22 mounted using a tape carrier package ("TCP") or a chip-on-film ("COF") to be electrically connected to the TFT substrate 12.

The circuit boards 25 are 26 are connected to the TFT substrate 12 through the connection films 23 and 24. The circuit boards 25 and 26 provide a power signal and a synchronization signal to the gate line, and provide a power signal, an image data signal, and a synchronization signal to the data line. As the circuit boards 25 and 26, a printed circuit board ("PCB") is generally used. Moreover, a flexible printed circuit board ("FPCB" which is thin in thickness, light in weight and convenient in use may be used as the circuit boards 25 and 26. In this case, various electronic elements including a power unit, a timing controller and a light source power unit may be mounted on the circuit boards 25 and 26.

As shown in FIG. 2, according to an exemplary embodiment, the backlight unit 100 includes the light source 111 which generates light, the light guide plate 113 which guides the light incident from the light source 111, the light sensor 131 which detects the light emitted from the light guide plate 113, and the mold frame 120 which receives the light source 111 the light guide plate 113 and the light sensor 131. According to an exemplary embodiment, the mold frame 120 includes the receiving recess 125 which receives the light sensor 131 and the light sensing structure 127 formed on the sidewall 123 thereof being in contact with a side of the light guide plate 113 which reflects the light emitted from the light guide plate 113 and provides the light emitted to the light sensor 131.

According to an exemplary embodiment, the light source 111 includes a lamp which generates white light, such as a cold cathode fluorescent lamp ("CCFL") a flat fluorescent lamp ("FFL"), and the like, or an LED providing a point light source. In the current exemplary embodiment, the light source 111 is an LED 111 including chips (not shown) which generates red, green and blue light, respectively.

The LED 111 generates light from red, green and blue chips arranged in parallel with each other and then mixes the generated light to thereby produce white light. According to an exemplary embodiment, a plurality of LEDs 111 is formed on a light source substrate 112 at regular intervals. The LEDs 111 generate tight by receiving driving signals and power from the light source substrate 112.

According to an exemplary embodiment, the light source substrate 112 may include a flexible printed circuit ("FPC") or a printed circuit board ("PCB"). According to an exemplary embodiment, both sides of the light source substrate 112 are formed longer to come in contact with a light source power unit (not shown) which supplies power to the light source 1171. Moreover, electrodes (not shown) are formed on both ends of the light source substrate 112 which supply driving power to the LEDs 111. The light source substrate 112 dissipates heat generated from the LEDs 111 to the outside.

According to an exemplary embodiment, the light guide plate 113 includes a first surface 113a, formed on a side thereof to which light is incident from the light source 111, and a second surface 113b opposite to the first surface 113a. The thickness of the light guide plate may be becoming smaller from the first surface 113a toward the second surface 113b. That is, according to an exemplary embodiment, the thickness of the light guide plate 113 is gradually reduced from a side to another side thereof. In addition, the light guide plate 113 diffuses light incident from the first surface 113a uniformly toward the light guide plate 113 and then guides the light towards the LCD panel 10. The light guide plate 113 includes a transparent polycarbonate ("PC") which includes excellent thermal resistance or a transparent acryl resin which includes a high refractive index such as polymethylmethacylate ("PMMA"). Moreover, according to an exemplary embodiment, a plurality of dots or V-shaped recesses may be formed on a lower surface of the light guide plate 113 to uniformly reflect the light.

A reflection sheet 114 reflects light which is emitted to the lower part of the light guide plate 113, to the light guide plate 113, and thus, improves usage efficiency of the light. To this end, a reflecting member including a high reflectance is coated on a base material (not shown) of the reflecting sheet 114. According to an exemplary embodiment, the base material may include, for example, aluminum, polyethylene terephtalate ("PET"), and the like. The reflecting member may include, for example, silver ("Ag"), titanium ("Ti"), and the like.

Optical sheets 115, 116 and 117 are formed on an upper portion of the light guide plate 113, and diffuse light which is emitted to an upper surface of the light guide plate 113. The optical sheets 115, 116 and 117 improve light efficiency by adjusting the orientation angle of light perpendicularly. The optical sheets include a diffusion sheet 115, a prism sheet 116 and a protection sheet 117.

The diffusion sheet 115 diffuses the light incident from the light guide plate 113 to have a uniform distribution in a wide range. In an exemplary embodiment, the diffusion sheet 115 includes a film made of a transparent resin coated with a predetermined light diffusing member on both sides of the film.

The prism sheet 116 is formed on an upper part of the diffusion sheet 115. Moreover, the prism sheet 116 provides light perpendicularly to the LCD panel 10 to improve light efficiency. In other words, the prism sheet 116 emits light by perpendicularly changing the path of light by a difference in refraction index. In this case, the light emitted from the prism sheet 116 is perpendicularly incident to the LCD panel 10, and thus, increases the brightness of the LCD panel 10.

In an exemplary embodiment, two or three diffusion sheets 115 and a plurality of prism sheets 116 may be used according to characteristics of the product.

The protection sheet 117 is formed on an upper part of the prism sheet 116. Moreover, the protection sheet 117 prevents the prism sheet 116 from being damaged by dust or scratch.

The light sensor 131 is formed in a lower part of the second surface 113b of the light guide plate 113 and detects color reproducibility of white light supplied to the LCD panel 10. The light sensor 131 detects white light emitted from the second surface 113b of the light guide plate 113. Moreover, the light sensor 131 analyzes the brightness of the white light and, when an abnormality is detected, controls the power supplied to the light source 111 to compensate the brightness of the light source 111. In an exemplary embodiment, the light sensor 131 may be mounted on a component mounting board 132 receiving electronic elements such as a memory, ROM, etc and formed in a package. In an exemplary embodiment, the light sensor 131 may further include a signal wiring board 133 connected to the component mounting board 132 to transmit signals.

The signal wiring board 133 includes a flexible printed circuit board ("FPCB"). A side of the signal wiring board 133 is connected to the component mounting board 132, and another side of the signal wiring board 133 is connected to the light source power unit of the driving circuit 20. Accordingly, the signal wiring board 133 receives a power control signal for controlling the power of the light source 111 from the light sensor 131 and supplies the same to the light source power unit.

According to an exemplary embodiment, the mold frame 120 includes a first receiving unit 121 which receives the LCD panel 10, a second receiving unit 122 which receives the light source 111, the reflection sheet 114, the light guide plate 113 and the optical sheets 115, 116 and 117, and a sidewall 123 including the light sensing structure 127. The mold frame 120 receives the light sensor 131 which detects the brightness of light emitted from the second surface 113b of the light guide plate 113 and formed in the rear of the mold frame 120. To this end, the receiving recess 125 is formed in the rear of the mold frame 120.

According to an exemplary embodiment the receiving recess 125 includes a hole 126 which penetrates the second receiving unit 122 of the mold frame 120. According to an exemplary embodiment, the hole 126 is formed in a rectangular shape in a central portion of the receiving recess 125, and exposes the light sensor 131 received in the receiving recess 125.

According to an exemplary embodiment, the light sensing structure 127 is formed in a recess shape on the sidewall 123 of the mold frame 120. Moreover the light sensing structure 127 is connected to the hole 126 of the receiving recess 125, and thus, increases the space reflecting light.

When the light sensing structure 127 formed in the mold frame 120, it is possible to maintain a regular interval from the light guide plate 113 during the assembly process.

Meanwhile, the LCD device according to an exemplary embodiment of the present invention further includes a top chassis 200 which fixes the backlight unit 100 to the LCD panel 10. The top chassis 200 combined with the mold frame 120 surrounds and fixes an edge of the LCD panel 10. At this time, the circuit boards 25 and 26 of the driving circuit 20 are bent by the connection films 23 and 24 and fixed on a side or the rear of the mold frame 120. The top chassis 200 includes a metal having low transformation and high strength.

Now the light sensing structure 127, in accordance with an exemplary embodiment of the present invention, will be described with reference to FIGS. 5 through 10.

Figure 5:
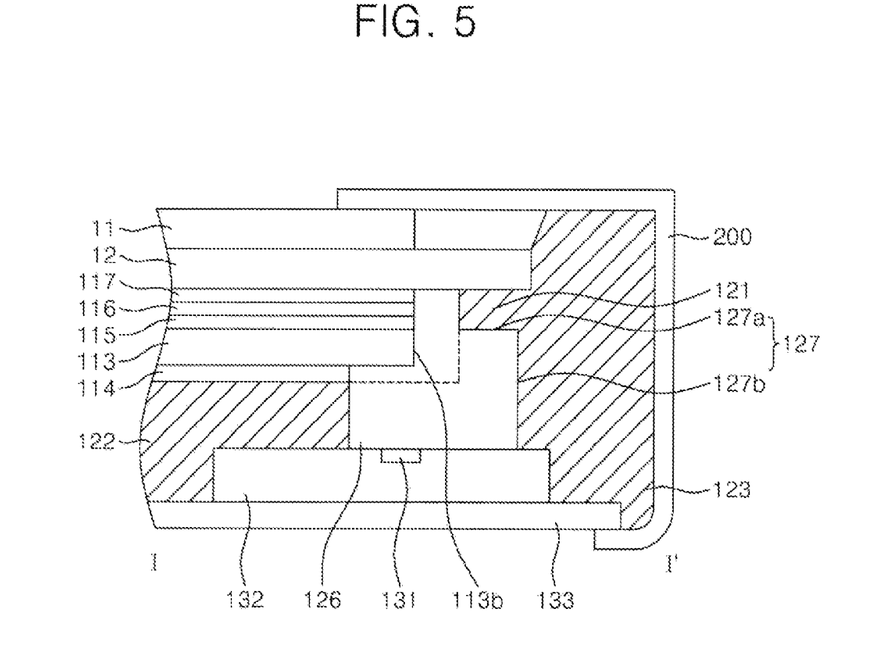
FIG. 5 is a cross-sectional view taken along fine I-I' in FIG. 1 according to an exemplary embodiment of the present invention.
Figure 6:
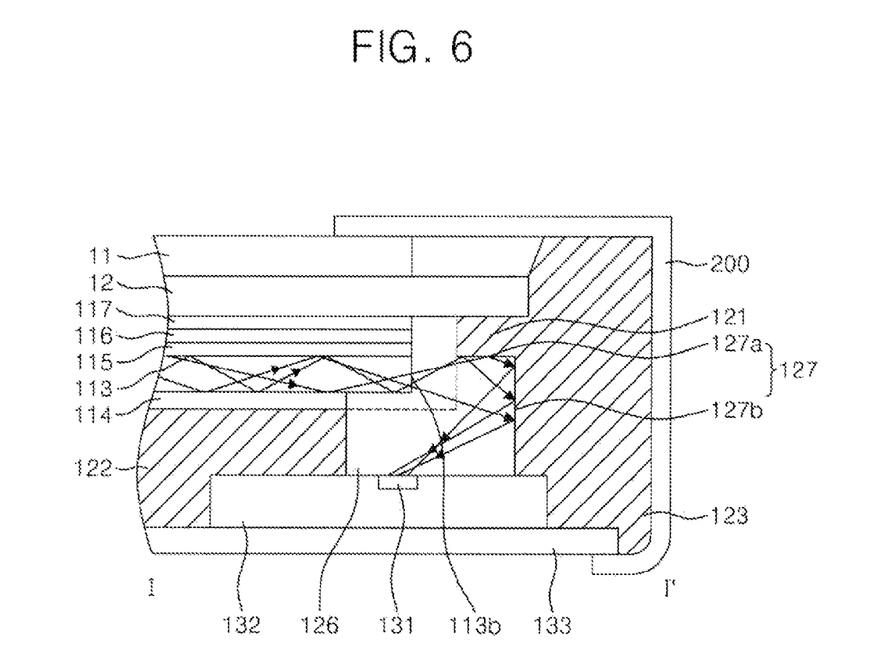
FIG. 6 is a cross-sectional view showing a light path of the backlight unit in FIG. 5, according to an exemplary embodiment of the present invention.

FIG. 5 is a cross-sectional view taken along line I-I' in FIG. 1 according to an exemplary embodiment of the present invention, and FIG. 6 is a cross-sectional view showing a light path of the backlight unit in FIG. 51 according to an exemplary embodiment of the present invention.

Referring to FIGS. 5 and 6, the light sensing structure 127 includes a first surface 127a formed parallel to the first receiving unit 121, and a second surface 127b connected to the first surface 127a and which is formed parallel to the second surface 113b of the light guide plate 113. According to an exemplary embodiment, the light sensing structure 127 may further include third and fourth surfaces (not shown) connected to the first and second surfaces 127a and 127b. An exemplary embodiment of the present invention will now be described based on the first and second surfaces 127a and 127b.

In the current exemplary embodiments the first and second surfaces 127a and 127b of the light sensing structure 127 are perpendicularly connected to each other. In this case, the structure of the light sensing structure 127 will be described in relation to the light sensor 131.

The light sensor 131 measures the brightness of light. The light sensor 131 measures the brightness of the light only when the intensity of the incident light is more than a predetermined level. A portion of the light refracted in the light guide plate 113 is emitted to the second surface 113b in an irregular path. In this case, it is necessary to provide a device or a structure for changing the path of the light towards the lower part of the light guide plate 113 such that the light sensor 131 may measure the brightness of the light including the irregular path. To this end, the first and second surfaces 127a and 127b of the light sensing structure 127 reflect the light to change the path of the light.

The first and second surfaces 127a and 127b of the light sensing structure 127 change the path of the irregularly emitted light as shown in FIG. 6, to increase the intensity of the light incident to the light sensor 131. The light is reflected at the first surface 127a and supplied to the second surface 127b. Then, the light is reflected at the second surface 127b and supplied to the light sensor 131 exposed through the hole 126. The hole 126 corresponds to a space formed in an upper part of the light sensor 131 to expose the light sensor 131. Accordingly, since the light reflected from the light sensing structure 127 is immediately emitted through the hole 126, it is possible to reduce the loss of the light intensity.

According to an exemplary embodiment, the light sensing structure 127 may further include a reflecting member 128 which reflects light, to thereby improve the light reflectance. The reflecting member 128 includes a material having excellent reflectance. Here, the reflecting member 128 may be formed according to various exemplary embodiments with reference to FIG. 7.

Figure 7:
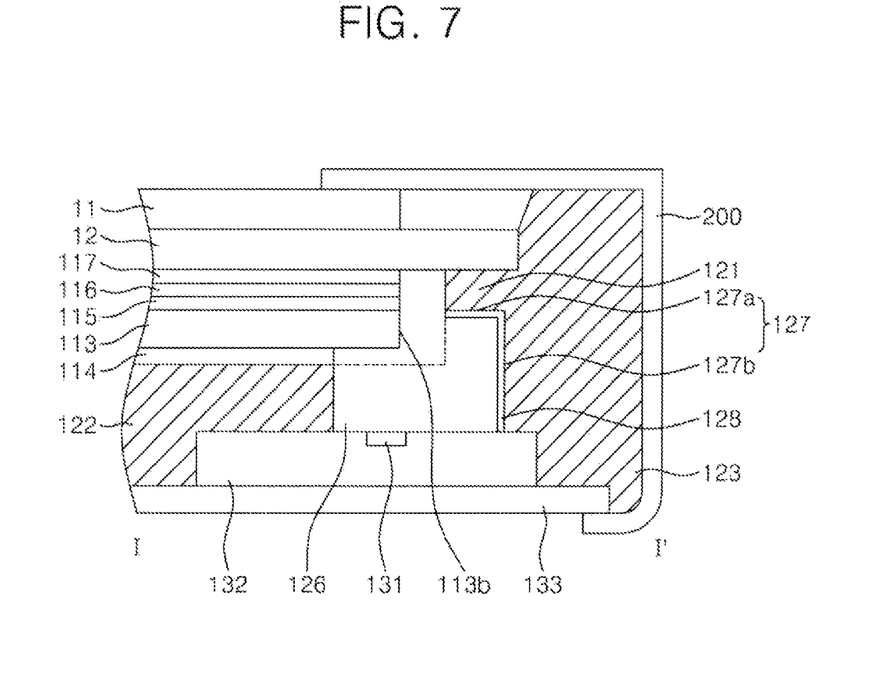
FIG. 7 is a cross-sectional view showing a light sensing structure of the backlight unit in FIG. 5, according to an exemplary embodiment of the present invention.

FIG. 7 is a cross-sectional view showing a light sensing structure of the backlight unit in FIG. 5, according to an exemplary embodiment of the present invention.

According to a first exemplary embodiment, the reflecting member 128 including a sheet is attached to the light sensing structure 127 using an adhesive member. For example, the reflecting member 128 includes polyethylene terephtalate ("PET") coated with silver ("Ag"), aluminum ("Al"), titanium ("Ti") or the like, like the reflection sheet 114. In this case, the reflecting member 128 is attached to the first and second surfaces 127a and 127b of the light sensing structure 127 using the adhesive member. According to an exemplary embodiment, the adhesive member is a double-sided adhesive tape which can form the surface of the reflecting member 128 uniformly. The adhesive member is not limited to the double-sided adhesive tape and various materials which can form the surface of the sheet of the reflecting member 128 uniformly may be used. According to an exemplary embodiment, the reflecting member 128 may be attached to any one of the first and second surfaces 127a and 127b.

According to a second exemplary embodiment, a side of the reflecting member 128B includes a material having excellent reflectance and another side of the reflecting member 128 includes an adhesive material such as an adhesive tape. For example, the reflecting member 128 includes an ordinary adhesive tape, of which one side is coated with silver ("Ag"), aluminum ("Al"), titanium ("Ti") or the like. In addition, the reflecting member 128 is attached to the light sensing structure 127.

According to a third exemplary embodiment, the reflecting member 128 is formed on the first and second surfaces 127a and 127b of the light sensing structure 127 coated with a reflective material, such as ("Ag"), aluminum ("Al"), titanium ("Ti") or the like.

The reflecting member 128 is formed in the same as the above-described exemplary embodiment to reduce a difference in the intensity between the light detected by the light sensor 131 and the light emitted from the second surface 113b of the light guide plate 113. Thus, the light sensor 131 can analyze the brightness of the incident light easily.

Figure 8:
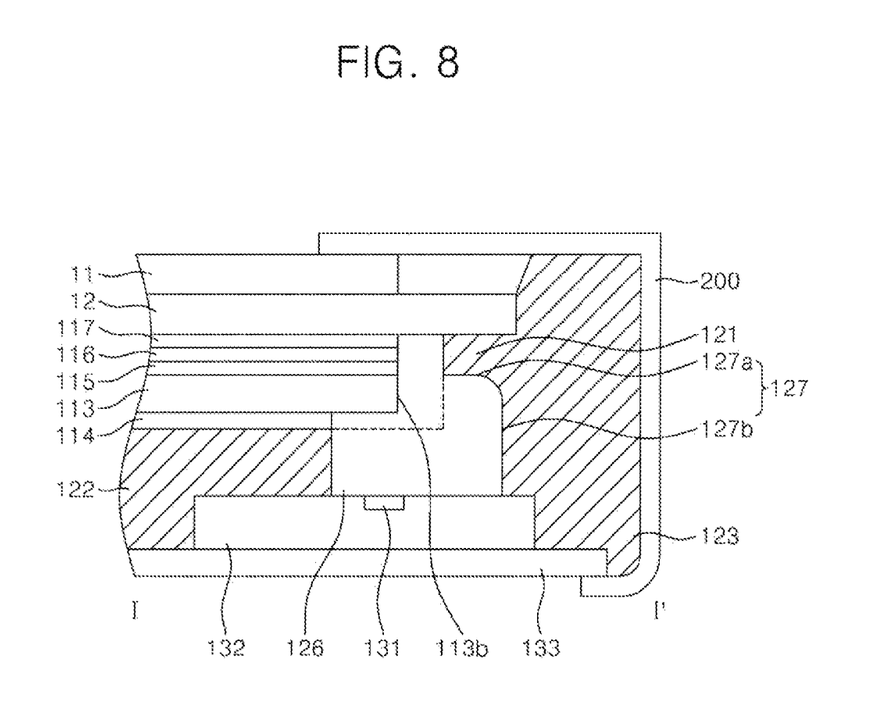
FIG. 8 is a cross-sectional view taken along line I-I' in FIG. 1 according to another exemplary embodiment of the present invention.
Figure 9:
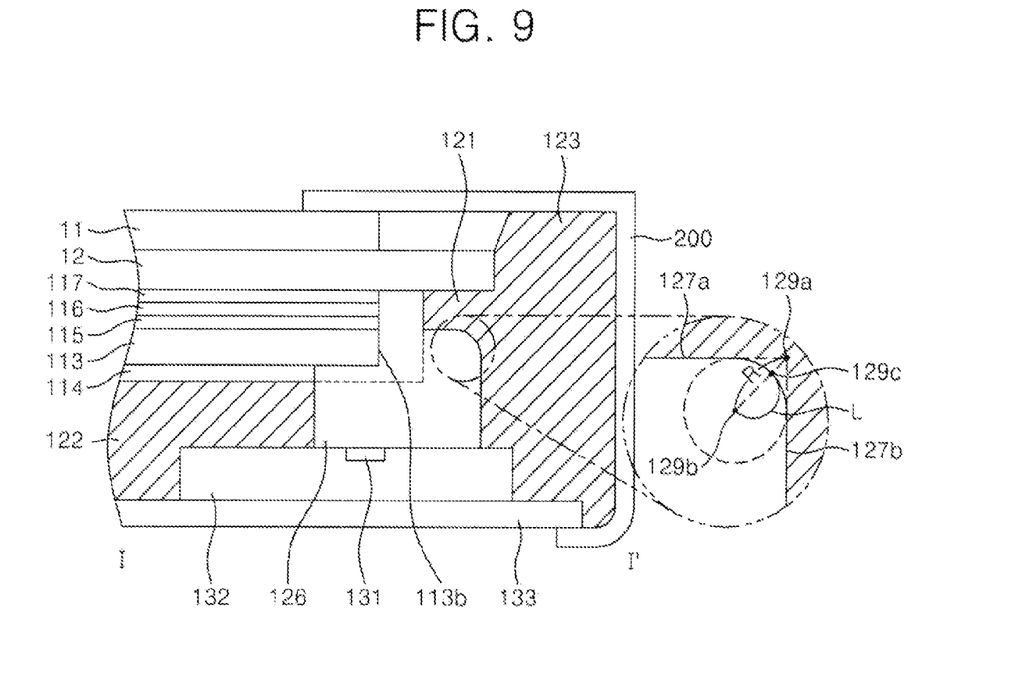
FIG. 9 is an enlarged cross-sectional view showing a reflecting member in FIG. 8, according to an exemplary embodiment of the present invention.
Figure 10:
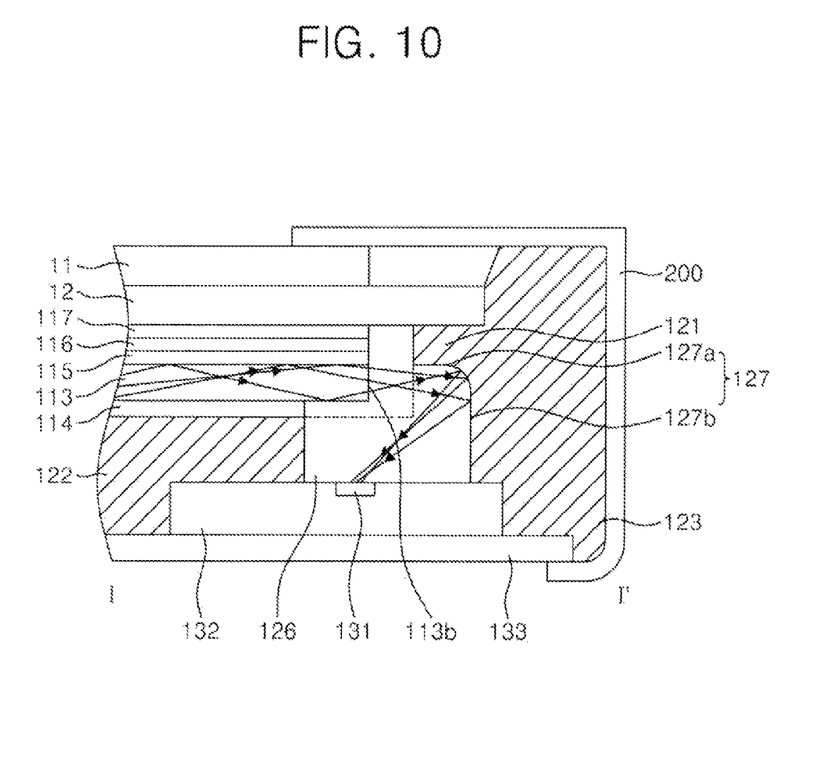
FIG. 10 is a cross-sectional view showing a light path of the backlight unit in FIG. 8, according to an exemplary embodiment of the present invention.

FIG. 8 is a cross-sectional view taken along line I-I' in FIG. 1 according to another exemplary embodiment of the present invention FIG. 9 is an enlarged cross-sectional view showing a reflecting member in FIG. 8 according to an exemplary embodiment and FIG. 10 is a cross-sectional view showing a light path of the backlight unit in FIG. 8 of an exemplary embodiment.

Referring to FIGS. 8 through 10, the first side 127a and the second side 127b of the light sensing structure 127 are formed with a curved surface and are connected to each other.

In more detail, an inside of the light sensing structure 127 is formed with a curved surface to receive the light of more than a predetermined amount. As shown in FIG. 9, a first virtual point 129a at which the first surface 127a and the second surface 127b meet each other is arbitrarily designated in the light sensing structure 127, and a second virtual point 129b is arbitrarily designated at a distance of R from the first virtual point 129a to the inside in the light sensing structure 127. Moreover, a third virtual point 129c is arbitrarily designated at a distance of L from the second point 129b. Thus, the inside of the light sensing structure 127 is defined by an arc of a circle which passes through the third point 129c and connects the first surface 127a with the second surface 127b. In other words, the light sensing structure 127 includes a curved surface connecting the first surface 127a with the second surface 127b by an arc of a circle having a radius L.

Referring to FIG. 10, the light sensing structure 127 reflects the irregularly incident light to the light sensor 131 by the concave curved surface at a time to prevent brightness deterioration of the light. Moreover, the light sensing structure 127 reflects the irregularly incident light to be concentrated into the light sensor 131. Accordingly, the light sensing structure 127 increases the amount of the light incident to the light sensor 131. According to an exemplary embodiment, the light sensing structure 127 may further include a reflecting member 128 which reflects light, to thereby improve the light reflectance.

Figure 11:
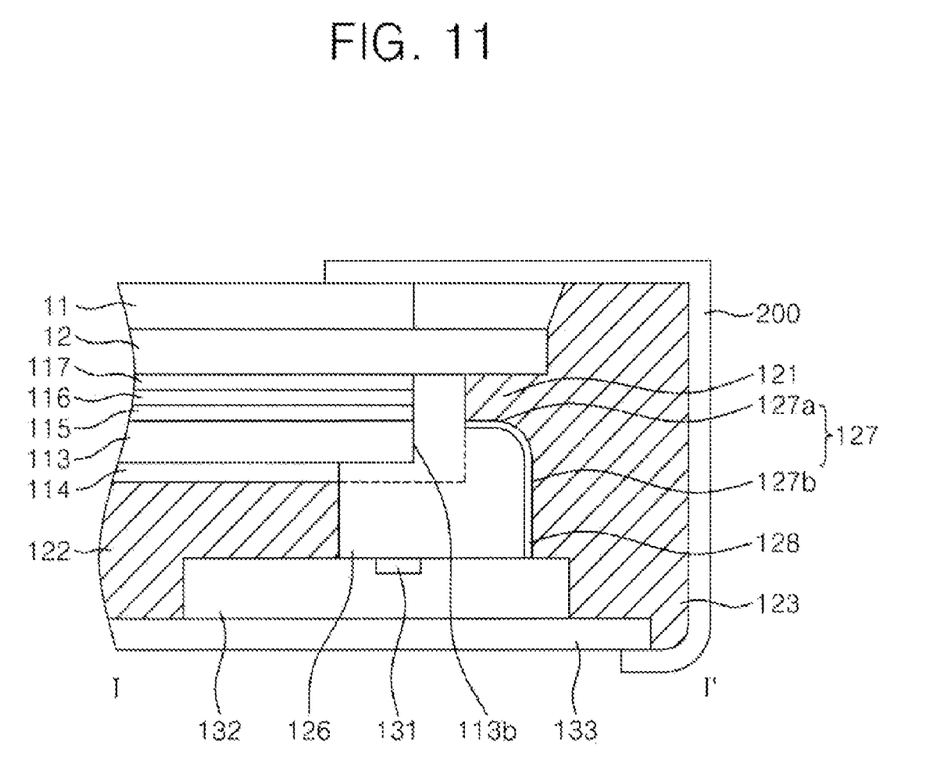
FIG. 11 is a cross-sectional view showing a reflecting member of the backlight unit in FIG. 8, according to an exemplary embodiment of the present invention.

FIG. 11 is a cross-sectional view showing a reflecting member of the backlight unit in FIG. 8, according to an exemplary embodiment of the present invention.

Referring to FIG. 11 the reflecting member 128 includes a material having excellent reflectance on the first surface 127a and the second surface 127b of the light sensing structure 127. According to an exemplary embodiment. The reflecting member 128 may be formed of the sheet, the adhesive tape and the coated reflective material in the same manner as the exemplary embodiments illustrated with reference to FIG. 7. Accordingly a detailed description of various exemplary embodiments for the reflecting member 128 will be omitted.

Since the reflecting member 128 is formed with the curved surface on the first and second surfaces 127a and 127b of the light sensing structure 127, it is possible to concentrate the light reflected from the light sensing structure 127 and thus increase the light reflectance.

As described above, the backlight unit 100 and the LCD device having the same in accordance with exemplary embodiments of the present invention include the mold tame 120 receiving the light guide plate 113. The mold frame 120 includes the light sensing structure 127 having the reflecting member 128. Thus, the backlight unit 100 and the LCD device improve the assembly efficiency of the backlight unit 100 and, at the same time, facilitate the brightness compensation of the LEDs 111 by supplying the light to the light sensor 131 uniformly. Moreover, the LCD device improves the display quality by immediately performing the brightness compensation of the LEDs 111, and increases the life span of the LEDs 111 in addition, since the LCD device includes the light sensor 131 provided without an increase in thickness and length of the LCD device the brightness compensation can be made even in products that require a small thickness such as a laptop computer or a monitor.

While the present invention has been shown and described with reference to some exemplary embodiments thereof, it should be understood by those of ordinary skill in the art that various changes in form and details may be made therein without departing from the spirit and the scope of the present invention as defined by the appended claims.

What is claimed is:

1. A backlight unit comprising:
   a light source which generates light;
   a light guide plate which guides the light incident from the light source and emits the light;
   a light sensor which detects the light emitted from the light guide plate; and
   a mold frame which receives the light source, the light guide plate and the light sensor, the mold frame including a receiving recess which receives the light sensor, and a light sensing structure formed on a sidewall thereof being in contact with a side of the light guide plate which reflects the light emitted from the light guide plate and provides the light emitted from the light guide plate to the light sensor.

2. The backlight unit of claim 1, wherein the light sensing structure is formed in a recess shape inside the sidewall.

3. The backlight unit of claim 2, wherein the light sensing structure comprises:
   a first surface which is formed inside the sidewall parallel to a bottom surface of the mold frame; and
   a second surface which is formed parallel to an outer surface of the sidewall.

4. The backlight unit of claim 3, wherein the first and second surfaces are vertically connected to each other.

5. The backlight unit of claim 3, wherein the first and second surfaces are connected to each other with a curved surface concave toward the light sensor.

6. The backlight unit of claim 3, wherein the light sensing structure further comprises a reflecting member which reflects light and which is attached to at least one of the first and second surfaces of the light sensing structure.

7. The backlight unit of claim 6, wherein the reflecting member comprises a sheet which reflects light.

8. The backlight unit of claim 7, wherein the sheet is attached to the light sensing structure using an adhesive member.

9. The backlight unit of claim 6, wherein the reflecting member comprises an adhesion tape formed of a material which reflects light on a side thereof.

10. The backlight unit of claim 6, wherein the reflecting member comprises a reflection layer coated with a reflective material on the light sensing structure.

11. The backlight unit of claim 1, wherein the receiving recess comprises a hole through which the light passes.

12. The backlight unit of claim 11, wherein the hole corresponds to a space formed in an upper part of the light sensor to expose the light sensor such that light reflected from the light sensing structure is emitted through the hole.

13. The backlight unit of claim 1, wherein the light source comprises a light emitting diode.

14. The backlight unit of claim 1, wherein the light guide plate comprises a first surface receiving the light supplied from the light source, and a second surface opposite to the first surface, wherein the thickness of the light guide plate is becoming smaller from the first surface toward the second surface.

15. The backlight unit of claim 1, wherein the light sensor comprises:
   a circuit board on which the light sensor is mounted; and
   a flexible printed circuit board which transmits a signal of the light sensor.

16. A liquid crystal display device comprising:
   a liquid crystal display panel which displays an image; and
   a backlight unit which supplies light to the liquid crystal display panel, the backlight unit comprising:
      a light source which supplies light to the liquid crystal display panel,
      a light guide plate which guides the light incident from the light source and emits the light toward the liquid crystal display panel,
      a light sensor provided in a lower part of the light guide plate which detects the light emitted from the light guide plate, and
      a mold frame which receives the light source, the light guide plate, and the light sensor, the mold frame including a receiving recess, formed in the rear of the mold frame which receives the light sensor, and a light sensing structure formed on a sidewall thereof being in contact with a side of the light guide plate which supplies the light emitted from the light guide plate to the light sensor.

17. The liquid crystal display device of claim 16, wherein the light sensing structure comprises:
   a first surface formed inside the sidewall parallel to a bottom surface of the mold frame; and
   a second surface formed parallel to an outer surface of the sidewall.

18. The liquid crystal display device of claim 17, wherein the light sensing structure further comprises a reflecting member which reflects light, to thereby improve light reflectance.

19. The liquid crystal display device of claim 18, wherein the reflecting member comprises at least one of a sheet which reflects light an adhesion tape of which a side is formed of a reflective material, and a reflection film coated with a reflective material on the light sensing structure.

20. The liquid crystal display device of claim 19, wherein the light sensor further comprises:
   a circuit board on which the light sensor is mounted; and
   a flexible printed circuit board which transmits a signal of the light sensor.

* * * * *